United States Patent [19]
Pillai

[11] Patent Number: 5,997,839
[45] Date of Patent: *Dec. 7, 1999

[54] LITHIATED MANGANESE OXIDE

[75] Inventor: G. Chithambarathanu Pillai, Peru, Ill.

[73] Assignee: Carus Chemical Company, LaSalle, Ill.

[*] Notice: This patent is subject to a terminal disclaimer.

[21] Appl. No.: 09/077,854

[22] PCT Filed: Sep. 30, 1997

[86] PCT No.: PCT/US97/17081

§ 371 Date: Jun. 2, 1998

§ 102(e) Date: Jun. 2, 1998

[87] PCT Pub. No.: WO98/14403

PCT Pub. Date: Apr. 9, 1998

Related U.S. Application Data

[63] Continuation-in-part of application No. 08/726,323, Oct. 3, 1996, Pat. No. 5,759,510.

[51] Int. Cl.⁶ .................................................. C01G 45/12
[52] U.S. Cl. ............................................................. 423/599
[58] Field of Search ............................................. 423/599

[56] References Cited

U.S. PATENT DOCUMENTS

| | | | |
|---|---|---|---|
| 4,246,253 | 1/1981 | Hunter . | |
| 4,312,930 | 1/1982 | Hunter . | |
| 4,590,059 | 5/1986 | Mellors . | |
| 4,975,346 | 12/1990 | Lecerf et al. . | |
| 4,980,251 | 12/1990 | Thackeray et al. | 429/224 |
| 5,135,732 | 8/1992 | Barboux et al. . | |
| 5,153,081 | 10/1992 | Thackeray et al. | 429/194 |
| 5,211,933 | 5/1993 | Barboux et al. | 423/596 |
| 5,478,672 | 12/1995 | Miltate | 423/599 |
| 5,561,006 | 10/1996 | Lecerf et al. | 429/218 |
| 5,604,057 | 2/1997 | Mazri . | |
| 5,605,773 | 2/1997 | Ellgen | 429/194 |
| 5,702,679 | 12/1997 | Sheargold et al. | 423/599 |
| 5,753,202 | 5/1998 | Wang et al. | 423/599 |
| 5,759,510 | 6/1998 | Pillai | 423/599 |
| 5,766,569 | 6/1998 | Ellgen et al. | 423/599 |

FOREIGN PATENT DOCUMENTS

| | | |
|---|---|---|
| 279235 | 8/1988 | European Pat. Off. . |
| 2221213 | 1/1990 | United Kingdom . |
| 98/14403 | 4/1998 | WIPO . |

OTHER PUBLICATIONS

Chen et al., "Cathodic Behavior of Alkali Manganese Oxides from Permanganate," J. Elecrochem. Soc., vol. 144, No. 4, Apr. 1997.

d'Yvoire et al., "Phase Transitions and Ionic Conduction in 3D Skeleton Phophates," Solid State Ionics 9 & 10 (1983) 851–858.

Goodenough et al., "Lithium Insertion/Extraction Reactions with Manganese Oxides," Rev. Chim. Miner., 21, 435 (1984).

Gummow et al., "Improved Capacity Retention in Rechargeable 4V Lithium/Lithium–Manganese Oxide (Spinel) Cells," Solid State Ionics, 69, 59–67 (1994).

Guyomard et al., "Li Metal–Free Rechargeable $LiMn_2O_4$/Carbon Cells: Their Understanding and Optimization," J. Electrochem. Soc., vol. 139, No. 4, Apr. 1992.

Masquelier et al., "Chemical and Magnetic Characterization of Spinel Materials in the $LiMn_2O_4$–$Li_2Mn_5O_9$–$Li_4Mn_4O_{12}$ System,"J. Solid State Chem. 123, 255–266 (1996).

Mizushima et al., "A New Cathode Material for Batteries of High Energy Density," Mat. Res. Bull., vol. 15, 783 (1980).

Nalbandyan et al., "New Modification of Lithium Monoferrite and the Morphotropic Series $AFeO_2$," Russian J. of Inorganic Chem. 32(3), 1987.

Ohzuku et al., "Electrochemistry of Manganese Dioxide in Lithium Non–aqueous Cell," J. Electrochem. Soc., vol. 137, No. 3, Mar. 1990.

Tarascon et al., "The $Li_{1+x}Mn_2O_4$/C Rocking–Chair System: A Review," Electrochimica Acta, vol. 38, No. 9, pp. 1221–1231, 1993.

Thackeray et al., "Structural Characterization of the Lithiated Iron Oxides $Li_xFe_3O_4$ and $Li_xFe_2O_3$ (0<x<2)," Mat. Res. Bull., vol. 17, pp. 785–793 (1982).

Thackeray, "Structural Considerations of Layered and Spinel Lithiated Oxides for Lithium Ion Batteries," J. Electrochem. Soc., vol. 142, No. 8, Aug. 1995.

Thomas et al., "Synthesis and Structural Characterization of the Normal Spinel $Li[Ni_2]O_4$," Mat. Res. Bull., vol. 20, pp. 1137–1146, (1985).

Tsang et al., "A New Route for the Synthesis of $LiMN_2O_4$ Cathode: Variation of Composition, Microstructure, and Electrochemical Behavior with Synthesis Temperature," Solid State Ionics 89 (1996) 305–312.

Whittingham, "The Role of Ternary Phases in Cathode Reactions," J. Electrochem. Soc., 123, 315 (1976).

Tarascon et al., "The Spinel Phase of $LiMn_2O_4$ as a Cathode in Secondary Lithium Cells," Elecrochem. Soc., vol. 138, No. 10, Oct. 1991.

Abraham, et al., "Lithiated Manganese Oxide Cathodes for Rechargeable Lithium Batteries", IEEE, (1996), pp. 317–323.

Bach, et al., Sol–Gel Synthesis of Manganese Oxides, Journal of Solid State Chemistry, 88, pp. 325–333, (1990).

Bach, et al., "Synthesis and Characterization of Lamellar $MnO_2$ Obtained from Thermal Decomposition of $NaMnO_4$ for Rechargeable Lithium Cells", Journal of Solid State Chemistry, 120, pp. 70–73 (1995).

Furukawa, et al., "Manganese Oxides for Lithium Secondary Battery", Proc. Electrochem. Soc., 88–6, pp. 557–564, (1988).

Gummow, R.J. et al., "Improved Capacity Retention . . . ", Solid State Ionics, 69 (1994), pp. 1–10.

Kelder, et al., Bulk Syntheses and Electrochemical Properties of Submicron Powders of $Li_xMn_2O_4$, pp. 114–117.

(List continued on next page.)

*Primary Examiner*—Steven Bos
*Attorney, Agent, or Firm*—Fitch, Even, Tabin & Flannery

[57] ABSTRACT

The invention is directed to making a lithiated manganese dioxide using low and high temperature calcination steps.

27 Claims, 1 Drawing Sheet

OTHER PUBLICATIONS

Li, et al., "Secondary Li Cells", Solid State Ionics 47 (1991), pp. 231–240.

Li, et al., "Lithium Intercalation from Aqueous Solutions", J. Electrochem. Soc., vol. 141, No. 9, Sep. 1994, pp. 2310–2316.

Manev, et al., "Synthesis of $LiMn_2O_4$ for Rechargeable Lithium–Ion Battery", Log Batteries, Battery Mater., vol. 14, (1995), pp. 101–124.

Momchilov, et al., "Rechargeable Lithium Battery with Spinel–Related $MnO_2$", Journal of Power Sources, 41 (1993) pp. 305–314.

Nohma, et al., "$Li/MnO_2$ (CDMO) Rechargeable Batteries", Proc. Electrochem. Soc., 91–3, pp. 311–317 (1991).

Nohma, et al., "Commercial Cells Based on $MnO_2$ and $MnO_2$–Related Cathodes", Chapter 11, Ind. Chem. Libr., 5(Lithium Batteries) pp. 417–456, (1994).

Pereira–Ramos, J.P., "Electrochemical Properties of Cathodic Materials Synthesized by Low–Temperature Techniques", Journal of Power Sources, 54 (1995) pp. 120–126.

Pistoia, et al., "Synthesis of Mn Spinels from Different Polymorphs of $MnO_2$", Journal of Power Sources, 56 (1995) pp. 37–43.

Rossouw, et al., "Alpha Manganese Dioxide for Lithium Batteries: A Structural and Electrochemical Study", Matt. Res. Bull., vol. 27, pp. 221–230, (1992).

Tarascon, et al., "Synthesis Conditions and Oxygen Stoichiometry Effects on Li Insertion into the Spinel $LiMn_2O_4$", J. Elecrochem. Soc., vol. 141, No. 6, Jun., 1994, pp. 1421–1431.

Thackeray, M.M., "Developments in Li–Mn–O Electrode Technology for Rechargeable Lithium Batteries", Progress in Batteries & Battery Materials, vol. 11 (1992) IBA Sydney (Australia) Meeting, pp.150–157.

Thackeray, et al., "Ramsdellite–$MnO_2$ for Lithium Batteries: The Ramsdellite to Spinel Transformation", Electrochimica Acta, vol. 38, No. 9, pp. 1259–1267, (1993).

Zachau–Christiansen, et al., "Insertion of Lithium into the Manganese Dioxides: Pyrolusite and Ramsdellite", Solid State Ionics 70/71 (1994) pp. 401–406.

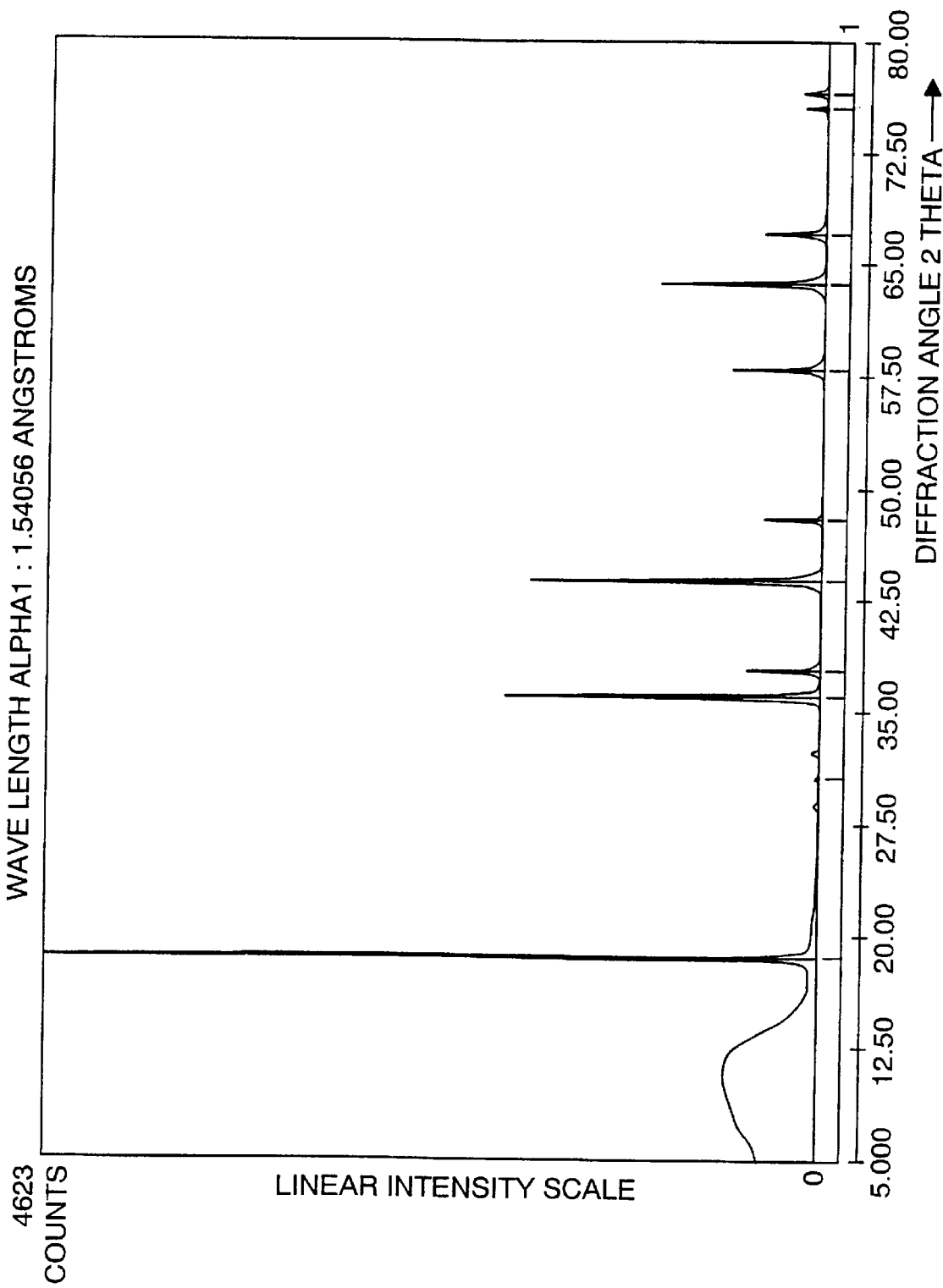

LITHIATED MANGANESE OXIDE

This is a continuation-in-part application of application Ser. No. 08/726,323, filed Oct. 3, 1996, now U.S. Pat. No. 5,759,510.

FIELD OF THE INVENTION

This invention relates to a method of making lithiated manganese oxide which is particularly useful in the manufacture of lithium/manganese batteries. More particularly, this invention is directed to making $LiMn_2O_4$ from an amorphous manganese dioxide where the $LiMn_2O_4$ has an x-ray pattern recognized as particularly useful in the manufacture of batteries.

BACKGROUND OF THE INVENTION

Manganese dioxide is a known material for use as a cathodic material in batteries. It also is known that it is not suitable for rechargeable batteries. Apparently irreversible structural changes occur in manganese dioxide during discharge which do not permit recharging.

Lithiated manganese oxide made from $MnO_2$ has been investigated for use in rechargeable batteries. The method of making the lithiated manganese oxide and the manganese dioxide starting material appears to materially affect the effectiveness of the lithiated manganese oxide used in rechargeable batteries. U.S. Pat. Nos. 4,312,930 and 4,246,253 to Hunter describes a lithiated manganese oxide which Hunter says has a particularly effective utility for rechargeable batteries. Each of these Hunter patents is incorporated herein as if fully rewritten.

Making lithiated manganese compounds is not necessarily new. Monchilov and Manev describe making 35 lithiated manganese compounds (see Journal of Power Sources, 41 (1993) 305–314 and Log Batteries, Battery Mater., Vol. 14 (1995), respectively), but do not describe making such compounds from relatively impure compounds which have a high sodium and/or potassium content and making relatively pure lithiated manganese compounds by removing the sodium and/or potassium and replacing those alkali metals with lithium to make a pure lithiated manganese compound.

An object of this invention is to provide a process for making lithiated manganese oxide.

Another object of this invention is to use chemically made manganese dioxide in making the lithiated manganese oxide by the process of the invention.

Yet another object of this invention is to make a pure form of lithiated manganese oxide from the reduction of an alkali metal permanganate or manganate such that the lithiated manganese oxide has a utility that is particularly effective for a cathodic material for rechargeable batteries.

Further objects and advantages of the invention will be found by reference to the following specification.

As used herein, $LiMn_2O_4$ means a lithiated manganese oxide with the general formula $Li_xMn_2O_4$ where x is greater than 0, less than about 2 and, in an important aspect is about 1.

As used herein, "amorphous manganese dioxide" means a manganese dioxide which does not have a substantially identifiable crystal structure as determined by x-ray diffractometry.

As used herein, "delta manganese dioxide" means a manganese dioxide which does not have a single crystal structure which dominates to provide a manganese dioxide with at least one identifiable crystal structure. Delta manganese dioxide is often described as having the following general formula $M_2O.4MnO_2$ where M is an alkali metal cation.

As used herein, "reducing permanganate" means taking manganese (VII) to manganese (III or IV).

As used herein, "substantially all Mn IV" means at least about 90 weight percent Mn IV and not more than about 10 weight percent Mn III.

SUMMARY OF THE INVENTION

The process of the invention provides a high purity $LiMn_2O_4$ from chemically made $MnO_2$. The lithiated manganese oxide has an especially effective utility for use as a cathodic material in batteries. The invention is particularly useful and nonobvious because it utilizes as a starting material a relatively inexpensive chemically made amorphous manganese dioxide with alkali metal in it, removes the unwanted alkali metals such as sodium and potassium, replaces the sodium and/or potassium with lithium and makes a pure spinel material which is especially useful for batteries. The invention has the ability to remove sodium and/or potassium to an amount of at least not more than about 0.005 moles of sodium and potassium together per mole of manganese in the lithiated manganese compound. Further, the chemically made manganese dioxide used in the invention should be distinguished from manganese dioxide made electrochemically (EMD). EMD is believed not to be an appropriate starting manganese dioxide for process of the invention because it will not work well or at least efficiently in the process of the invention.

Typically sodium and potassium are considered undesirable in making a high purity spinel manganese compound where the sodium and potassium must be removed. In the process of the invention, these metals are used to form $M_2MnO_4$ and $M_3MnO_4$ (where M is Na or K) which are stable at alkaline pH and are removed in an LiOH wash.

The process of the invention also surprisingly does not make significant amounts, as prior art processes do, of $Mn_2O_3$ and $Li_2MnO_3$ (a so-called "rock salt compound). The process of the invention, through the use of an excess of lithium compound and calcination of a blend of $MnO_2$ and lithium compound at low calcination temperatures in a first calcination, avoids the formation of the rock salt compound. While not intending to be bound by theory, it is believed that the process of the invention does not form the aforedescribed impurities, quickly incorporates lithium into a manganese dioxide structure and does not permit the lithium to volatilize during a calcining step.

The invention provides a method of making $LiMn_2O_4$, a lithiated manganese oxide, from amorphous manganese dioxide for which $LiMn_2O_4$ is particularly useful as cathodic material for rechargeable batteries. The invention provides for blending an amorphous $MnO_2$ with a lithium compound, such as LiOH, to provide a lithium/manganese oxide blend. The lithium in the lithium compound is in stoichiometric excess of the manganese in the manganese dioxide, such that there is more than about one equivalent mole lithium for every mole of manganese dioxide (one equivalent of lithium ion for every mole of manganese dioxide). In another aspect, an excess of lithium compound is sufficient to replace potassium and sodium in the manganese dioxide which excess is effective for providing the resulting lithiated manganese oxide with the ability to provide at least about four volts of electromotive force when the lithiated manganese oxide is used as a cathode material in a rechargeable battery which is recyclable at least about fifty times.

The lithium/manganese oxide blend first is calcined at a temperature range of from about 150° to about 550° C. for about 2 to about 72 hours to provide an initially calcined lithium/manganese complex. In an important aspect, the initial calcination may be done rapidly in from about 2 to about 10 hours at about 300° C. to about 500° C. The molar ratio of lithium to manganese in the initially calcined complex is adjusted to about one lithium atom to two manganese atoms to provide a stoichiometric lithium/manganese complex. This is uniquely done by exposing the initially calcined lithium/manganese complex to an aqueous environment which includes aqueous lithium and adjusting the pH of the environment to about 6.0 to about 6.5. This generally will be effective for providing one lithium atom for about every two manganese atoms in the initially calcined complex. The stoichiometric lithium/manganese complex is calcined at a temperature range of from about 500° to about 900° C. for a time effective for providing lithiated manganese oxide having the formula $LiMn_2O_4$. The second calcination is done at a time and temperature effective for providing the lithiated manganese oxide with the capability of providing an electromotive force of from about 3 to about 4 volts in a circuit without load when the lithiated manganese oxide is used as a cathodic material in a battery which is recyclable at least about 50 times.

The invention is particularly useful in that it permits the utilization of a chemically made form of $MnO_2$ as a starting material. In this aspect the $MnO_2$ may be made from the reduction of permanganate or manganate. In an important aspect this reduction is done by an organic compound. In an important aspect of the invention the starting manganese dioxide results from the reduction of permanganate [Mn (VII)] to a manganese dioxide which is substantially all (at least 90 weight percent) manganese IV, although the manganese dioxide starting material may include some manganese III.

In an another important aspect of the invention, the permanganate reduction reaction is the reaction of an alkali metal permanganate such as $KMnO_4$ or $NaMnO_4$ with an organic reducing agent such as a compound containing side chain methyl groups. These compounds include fumaric acid, propanol, glucose, toluene sulphonamide, picoline, methyl substituted pyridines, dimethyl substituted pyridines and alkene compounds which reduce the permanganate. In this aspect the permanganate reduction is under alkaline conditions which means that it is conducted at a pH of above about 7 and preferably above about 10. The most common forms of permanganate are potassium and sodium permanganate with potassium permanganate being more common than sodium permanganate. The latter permanganates are commonly used as oxidizers, and as oxidizers, are reduced in an oxidation/reduction reaction which commonly produces $MnO_2$ as a by-product. The invention advantageously uses this by-product.

As discussed above, an important aspect of the invention involves the use of sodium and/or potassium containing $MnO_2$, such as $MnO_2$ from a sodium and/or potassium permanganate or manganate oxidation/reduction reaction with the advantageous removal of these alkali metals. In this aspect of the invention, the permanganate or manganate is an alkali metal permanganate or manganate such as potassium or sodium permanganate. The initially calcined lithium/manganese complex made from the alkali metal permanganate or manganate is washed in an aqueous medium to remove alkali metal manganate impurities where the aqueous medium comprises lithium ion such as from aqueous LiOH. This washing precludes the addition of deleterious ions to the lithium/manganese complex and removes sodium and potassium contaminants which often are in the form of $M_2MnO_4$ or $M_3MnO_4$ (where M is potassium or sodium). $M_2MnO_4$ or $M_3MnO_4$ are stable in a LiOH/water medium at a pH of from about 11 to about 13 or more so that they solubilize and wash from the lithium/manganese dioxide complex. Thereafter the washed initially calcined complex is slurried in an acidic aqueous medium at a pH of from about 6.0 to about 6.5 to control the stoichiometry of the final product such that $Li_xMn_2O_4$ has x greater than 0 but less than about 2. In an important aspect the pH is controlled so that x is about 1. This permits the production of the lithiated manganese oxide which is free from potassium and sodium which would ultimately have a deleterious effect on the use of the lithiated manganese compound in batteries.

In another important aspect of the invention, the lithiated compound of the invention exhibits an x-ray diffraction pattern as described herein and as shown in FIG. 1.

DESCRIPTION OF THE PREFERRED EMBODIMENTS

The invention provides a method of making $LiMn_2O_4$ from amorphous manganese dioxide. The method of the invention provides $LiMn_2O_4$ which is particularly useful as cathodic material for rechargeable batteries. The invention permits the use of an amorphous $MnO_2$ which is a by-product of an oxidation/reduction reaction. In an important aspect a permanganate or manganate salt, particularly an alkali metal permanganate or manganate, is reduced during an oxidation of an organic compound by the permanganate or manganate salt. The oxidation/reduction reaction using an organic reducing agent is conducted at a pH of at least 7, but in an important aspect is conducted at a pH above about 10. The manganese dioxide that results from the oxidation/reduction reaction is amorphous and may be characterized as delta manganese dioxide. The organic compound reduces permanganate or the manganate such that the resulting manganese dioxide is substantially all manganese IV (at least about 90 weight percent manganese IV). Not more than about 10 weight percent of the resulting manganese dioxide is manganese III.

The organic compound which may be used in the oxidation/reduction reaction may be an organic compound having side chain lower alkyl groups (side chains having one to four carbon atoms, such as methyl, ethyl, propyl and butyl groups). Such compounds include alkyl substituted pyridines and dialkyl substituted pyridines having the general formula

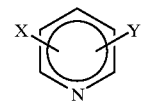

where at least one of x and y are methyl, ethyl, propyl and butyl, but one x or y may be H. Other organic compounds which may be used to reduce the permanganate or manganate include fumaric acid, propanol, glucose, toluene sulphonamide, picoline and the compounds listed below in Table I. Table I illustrates the pH of the dependency of the oxidation/reduction reaction and illustrates the need for alkaline conditions when an organic reducing agent is used.

TABLE I

Organic Compounds which Reduce Aqueous Permanganate as reported in the Chemical Literature*

| COMPOUND | pH 7 | pH 10 |
| --- | --- | --- |
| Propanal | Reaction | Reaction |
| Propylamine | No reaction | Reaction |
| Ethyl formate | No reaction | Reaction |
| Alanine | No reaction | Reaction |
| Pyruvic acid | Reaction | Reaction |
| Acrolein | Reaction | Reaction |
| Allylamine | Reaction | Reaction |
| Acrylic acid | Reaction | Reaction |
| Allyl alcohol | Reaction | Reaction |
| Benzaldehyde | Reaction | Reaction |
| Phenol | Reaction | Reaction |
| Aniline | Reaction | Reaction |
| Benzyl alcohol | Reaction | Reaction |
| 2-Butanone | No reaction | Reaction |

*[Organic compound] = 50 mg/L.
[KMnO$_4$] = 32 mg/L.
Consumption of 10 mg/L of KmnO$_4$ in 6 hours is an indication that a reaction had taken place.

In another aspect an inorganic reducing agent may be used. When manganese nitrate is used as the reducing agent, acid or alkaline conditions may be used.

The amorphous manganese dioxide from the oxidation/reduction reaction is blended with an excess of lithium compound such as LiOH, to provide a lithium/manganese blend. The lithium in the lithium compound is in stoichiometric excess of the manganese in the manganese dioxide, such that there is more than about one equivalent mole lithium for every mole of manganese dioxide (one equivalent of lithium ion for every mole of manganese dioxide). In another aspect, an excess of lithium compound is sufficient to replace potassium and/or sodium in the manganese dioxide which excess is effective for providing the resulting lithiated manganese oxide with the ability to provide at least about four volts of electromotive force when the lithiated manganese oxide is used as a cathode material in a rechargeable battery which is recyclable at least about fifty times and more importantly recyclable at least 300 times. In another important aspect, the blend should comprise from about 1.6 to about 3.0 moles of the lithium compound for every mole of manganese dioxide. More than about 3 mole equivalents of lithium could be used, but to keep the process economic, recycling or some other method of conserving the lithium probably would have to be used. Other lithium compounds which may be used in the first calcination include lithium oxide, lithium carbonate, lithium nitrate and lithium sulfate. In an important aspect about one mole of manganese dioxide is blended with about three moles of lithium hydroxide. The blending is between solid ingredients. No organic solvents, except possibly in trace amounts, are present. As used herein, trace amount means less than about 5 weight percent.

The lithium/manganese blend first is calcined at a time and temperature effective for providing lithium in an initially calcined manganese complex where the complex does not have more than about 10 weight percent of material in a "rock salt phase" which has the formula Li$_2$MnO$_3$. The excess lithium in the lithium compound replaces the sodium and/or potassium in the manganese dioxide which is effectively contaminated with sodium and/or potassium. The "rock salt phase" will be formed if the temperature is too high. If the temperature is too low, the alkali present in the blend will not be completely converted into manganates and significant amounts of the alkali will not be removed in subsequent washing steps. Moreover, the initially calcined product, which after washing as described herein, will not provide the spinel end product after the second calcination. Generally the time and temperature for the first calcination is in the range of from about 150° to about 550° C. for about 2 to about 72 hours to provide an initially calcined lithium/manganese complex. In an important aspect, the first calcination is done at from about 300° to about 500° C. for about 2 to about 10 hours.

After the first calcination, the initially calcined complex is washed with a 2% lithium hydroxide solution. In the wash, about three parts 2% lithium hydroxide solution is mixed with about one part initially calcined complex to form a slurry. The liquid is decanted from the solid. The slurrying and decanting is repeated once more with LiOH solution and finally with water. The washed and decanted cake is filtered. The filtered wet cake is then resuspended by mixing with about three parts of water to form a slurry, such that the slurry has a pH in the range of about 11 to about 13. Thereafter, the pH of the slurry is brought down to about 6.0 to about 6.5, and preferably to about 6.1 to about 6.2 to provide a stoichiometric lithium/manganese complex. This is an important aspect of the invention. Acids which may be used to lower the pH of the water/initially calcined complex slurry include sulfuric acid, nitric acid, phosphoric acid, hydrochloric acid and hydrofluoric acid. In an important aspect, however, it has been found that sulfuric acid, nitric acid and phosphoric acid are particularly effective in adjusting pH and aid in the removal of sodium and/or potassium. The lithium hydroxide wash is important because it removes alkali metal manganates from the initially calcined complex.

These manganates are stable at an alkaline pH, are solubilized in the wash step, and are removed from the initially calcined complex by filtering, decanting or other means of separating the complex from the aqueous medium. The pH adjustment is important because the pH controls the ratio of lithium and manganese in the ultimate product, Li$_x$Mn$_2$O$_4$. If the pH is too low, or below about 6.0, the final product may be contaminated with lower valent manganese oxides, such as Mn$_2$O$_3$. If the pH is too high, or above about 6.5, the final product may be contaminated with Li$_2$MnO$_3$.

After the initially calcined lithium/manganese complex has been washed and pH adjusted with acid to provide the stoichiometric complex, the stoichiometric complex is calcined at generally a higher temperature to provide the final stoichiometric lithium/manganese complex or lithiated manganese dioxide. This calcination is done for a time and temperature to provide a final lithium/manganese complex which will have a general formula Li$_x$n$_2$O$_4$ where x is greater than 0, but less than about 2. In an important aspect, this calcination will provide a product where x is about 1. In another important aspect, this calcination will provide an electromotive force of from about 3 to about 4 volts without load when it is used as a cathodic material in a battery which is recyclable at least about 50 times. In an important aspect, the stoichiometric calcination is at a temperature of from about 500° to about 900° C. from about 2 to about 72 hours and preferably from about 750° to about 850° C. for about 10 to about 30 hours and most preferably for about 4 hours at 800° C.

The following examples set forth how to practice the invention.

EXAMPLE 1

A. The permanganate reduction reaction to make amorphous MnO$_2$:

1 mole of fumaric acid, 3 moles of potassium hydroxide, 20 moles of water and 3.6 moles of potassium permanganate are mixed, heated to about 70° C.–80° C. and reacted in a reduction reaction of the permanganate to provide hydrous manganese dioxide. The resulting manganese dioxide is amorphous and is without a specific crystal structure.

B. The conversion of the $MnO_2$ of example 1(A) to lithiated manganese dioxide:

The manganese dioxide of example 1(A) (1 part) and 0.68 parts of $LiOH.H_2O$ are blended and then calcined at about 450° C. for about 16 hours to form a first calcined product. 1 part of the first calcined product is slurried in a 7.6 parts of 2% LiOH, the supernatant liquid containing the potassium salts and LiOH were decanted, the solids are reslurried in 7.6 parts of water and decanted again and then filtered or centrifuged. About 1 part of the wet centrifuged calcined product is slurried with 3 parts water and about 0.3 parts of concentrated sulfuric acid is added to the slurry, so as to adjust the pH of the slurry to about 6.0–6.2. Once the pH of the slurry has been stabilized to the above said pH range, the contents are allowed to settle, the liquid is decanted, the solids are resuspended with 3 parts water, the liquid is decanted and the solids are filtered or centrifuged. The solids after the pH adjustment are calcined at 800° C. for about 16 hours to provide $LiMn_2O_4$.

EXAMPLE 2

A. The permanganate reduction reaction to make amorphous $MnO_2$:

1 mole of 2-propanol, 0.75 moles of potassium hydroxide, 20 moles of water and 1.5 moles of potassium permanganate are mixed, heated to about 70° C.–80° C., and reacted in a reduction reaction of the permanganate to provide hydrous manganese dioxide. The resulting manganese dioxide is amorphous and is without a specific crystal structure.

B. The conversion of the $MnO_2$ of example 2(A) to lithiated manganese dioxide:

The manganese dioxide of example 2(A) (1 part) and 0.68 parts of $LiOH.H_2O$ are blended and then calcined at about 450° C. for about 16 hours to form a first calcined product. 1 part of the first calcined product is slurried in a 7.6 parts of 2% LiOH, the supernatant liquid containing the potassium salts and LiOH is decanted, the solids are reslurried in 7.6 parts of water and decanted again and then filtered or centrifuged. About 1 part of the wet centrifuged calcined product is slurried with 3 parts water and about 0.3 parts of concentrated sulfuric acid is added to the slurry, so as to adjust the pH of the slurry to about 6.0–6.2. Once the pH of the slurry has been stabilized to the above said pH range, the contents are allowed to settle, the liquid is decanted, the solids are resuspended with 3 parts water, the liquid is decanted and the solids are filtered or centrifuged. The solids after the pH adjustment are calcined at 800° C. for about 16 hours to provide $LiMn_2O_4$.

EXAMPLE 3

A. The permanganate reduction reaction to make amorphous $MnO_2$:

1 mole of D-glucose, 5 moles of potassium hydroxide, 30 moles of water and 6.7 moles of potassium permanganate are mixed, heated to about 70° C.–80° C. and reacted in a reduction reaction of the permanganate to provide hydrous manganese dioxide. The resulting manganese dioxide is amorphous and is without a specific crystal structure.

B. The conversion of the $MnO_2$ of example 3(A) to lithiated manganese dioxide:

The manganese dioxide of example 3(A) (1 part) and 0.68 parts of $LiOH.H_2O$ are blended and then calcined at about 450° C. for about 16 hours to form a first calcined product. 1 part of the first calcined product is slurried in a 7.6 parts of 2% LiOH, the supernatant liquid containing the potassium salts and LiOH is decanted, the solids are reslurried in 7.6 parts of water and decanted again and then filtered or centrifuged. About 1 part of the wet centrifuged calcined product is slurried with 3 parts water and about 0.3 parts of concentrated sulfuric acid is added to the slurry, so as to adjust the pH of the slurry to about 6.0–6.2. Once the pH of the slurry has been stabilized to the above said pH range, the contents are allowed to settle, the liquid is decanted, the solids are resuspended with 3 parts water, the liquid is decanted and the solids are filtered or centrifuged. The solids after the pH adjustment are calcined at 800° C. for about 16 hours to provide $LiMn_2O_4$.

EXAMPLE 4

A. The Permanganate Reduction to make Amorphous $MnO_2$:

One part of o-toluene sulphonamide, 1.5 parts of potassium permanganate, 0.5 parts NaOH and about 16 parts of additional water are mixed, heated to about 40° C. to about 50° C. and reacted in a reduction reaction of the permanganate to provide hydrous manganese dioxide. The resulting manganese dioxide product, collected and washed with water, is amorphous and is without a specific crystal structure.

B. The Conversion of the $MnO_2$ of Example 4(A) to Lithiated Manganese Dioxide:

The manganese dioxide of Example 4(A) (1 part) and 0.68 parts of $LiOH.H_2O$ are blended and then calcined at about 450° C. for about 16 hours to form a first calcined product. One part of the first calcined product, 7.6 parts of 2% LiOH and 7.5 parts of water are slurried, the calcined product centrifuged and the water and aqueous LiOH decanted therefrom to form a washed calcined product. About 1 part of the wet centrifuged calcined product is slurried with 3 parts water and about 0.3 parts of concentrated sulfuric acid is added to the slurry, so as to adjust the pH of the slurry to about 6.0–6.2. Once the pH of the slurry has been stabilized to the above said pH range, the contents are allowed to settle, the liquid is decanted, the solids are resuspended with 3 parts water, the liquid is decanted and the solids are filtered or centrifuged. The solids after the pH adjustment are calcined at 800° C. for about 16 hours to provide $LiMn_2O_4$.

EXAMPLE 5

A. The Permanganate Reduction Reaction to make Amorphous $MnO_2$:

One mole of 2,3 picoline, 2.65 moles of potassium permanganate and about 70 moles of additional water are mixed, heated to about 70° C. to about 80° C. and reacted in a reduction reaction of the permanganate to provide hydrous manganese dioxide. The resulting manganese dioxide product, collected and washed with water, is amorphous and is without a specific crystal structure.

B. The Conversion of the $MnO_2$ of Example 5(A) to Lithiated Manganese Dioxide:

The manganese dioxide of Example 5(A) (1 part) and 0.68 parts of $LiOH.H_2O$ are blended and then calcined at about 450° C. for about 16 hours to form a first calcined product. One part of the first calcined product, 7.6 parts of 2% LiOH and 7.5 parts of water are slurried, the calcined product centrifuged and the water and aqueous LiOH decanted therefrom to form a washed calcined product. About 1 part of the wet centrifuged calcined product is slurried with 3 parts water and about 0.3 parts of concentrated sulfuric acid is added to the slurry, so as to adjust the pH of the slurry to about 6.0–6.2. Once the pH of the slurry has been stabilized to the above said pH range, the contents are allowed to settle, the liquid is decanted, the solids are resuspended with 3 parts water, the liquid is decanted and the solids are filtered or centrifuged. The solids after the pH adjustment are calcined at 800° C. for about 16 hours to provide $LiMn_2O_4$.

What is claimed is:

1. A method for making lithiated manganese oxide, the method comprising:

providing amorphous manganese dioxide which includes an alkali metal selected from the group consisting of sodium, potassium and mixtures thereof;

blending the amorphous manganese dioxide with a lithium compound to provide a lithium compound/manganese dioxide blend, the lithium in the lithium compound being in stoichiometric excess of more than about one equivalent mole lithium for every mole of manganese in the manganese dioxide;

calcining the lithium compound/manganese dioxide blend at from about 150° to about 550° C. for about 2 to about 72 hours to provide an initially calcined lithium/manganese complex;

washing the initially calcined lithium/manganese complex with aqueous lithium hydroxide to provide a washed initially calcined lithium/manganese complex, the washing being effective to provide the washed lithium/manganese complex which when slurried with water at a ratio of about 1 part complex to about 3 parts water will result in an aqueous slurry with a pH in the range of from about 11 to about 13;

slurrying the washed initially calcined lithium/manganese complex with water to provide an aqueous slurry and adjusting the pH of the aqueous slurry of the washed lithium/manganese complex to a pH of less than about 7, the pH adjustment effective to provide a lithium/manganese complex which when calcined will provide a lithiated manganese compound having the formula $Li_xMn_2O_4$ where x is greater than 0 and less than about 2; and calcining the lithium/manganese complex from about 500° to about 900° C. for a time effective to provide the lithiated manganese compound having the formula $Li_xMn_2O_4$ where x is greater than 0 and less than about 2.

2. A method as recited in claim 1 wherein the lithium compound is selected from the group consisting of lithium oxide, lithium carbonate, lithium nitrate, lithium sulfate, lithium hydroxide and mixtures thereof.

3. A method as recited in claim 1 wherein the lithium compound is lithium hydroxide.

4. A method as recited in claim 1 or 3 wherein the pH of the aqueous slurry of the washed initially calcined lithium/manganese complex is adjusted to a range of from about 6.0 to about 6.5.

5. A method as recited in claim 4 wherein x is about 1.

6. A method for making lithiated manganese oxide, the method comprising:

chemically reducing an alkali metal manganese compound selected from the group consisting of sodium permanganate, potassium permanganate, sodium manganate, potassium manganate and mixtures thereof to provide an amorphous reduced manganese dioxide which includes an alkali metal selected from the group consisting of sodium, potassium and mixtures thereof;

blending the reduced manganese dioxide with a lithium compound to provide a lithium/manganese dioxide blend, the lithium in the lithium compound being in excess in an amount effective to replace the sodium and potassium alkali metal in the manganese dioxide to provide the lithiated manganese oxide with the ability to provide at least about four volts of electromotive force when the lithiated manganese oxide is used as a cathode material in a rechargeable battery;

calcining the lithium/manganese dioxide blend at from about 150° to about 550° C. for about 2 to about 72 hours to provide an initially calcined lithium/manganese complex;

washing the initially calcined lithium/manganese complex with aqueous lithium hydroxide to provide a washed initially calcined lithium/manganese complex, the washing being effective to provide the washed initially calcined lithium/manganese complex which when slurried with water at a ratio of about 1 part complex to about 3 parts water will result in an aqueous slurry with a pH in the range of from about 11 to about 13;

slurrying the washed initially calcined lithium/manganese complex with water to provide an aqueous slurry and adjusting the pH of the aqueous slurry of the washed lithium/manganese complex to a pH of less than about 7, the pH adjustment effective to provide a lithium/manganese complex which when calcined will provide a lithiated manganese compound having the formula $Li_xMn_2O_4$ where x is greater than 0 and less than about 2; and calcining the lithium/manganese complex from about 500° to about 900° C. for a time effective to provide the lithiated manganese compound having the formula $Li_xMn_2O_4$ where x is greater than 0 and less than about 2.

7. A method as recited in claim 6 wherein the lithium compound is selected from the group consisting of lithium oxide, lithium carbonate, lithium nitrate, lithium sulfate, lithium hydroxide and mixtures thereof.

8. A method as recited in claim 6 wherein the lithium compound is lithium hydroxide.

9. A method as recited in claims 7 or 8 wherein the pH of the aqueous slurry of the washed initially calcined lithium/manganese complex is adjusted to a range of from about 6.0 to about 6.5.

10. A method as recited in claim 9 wherein x is about 1.

11. A method for making lithiated manganese oxide, the method comprising:

chemically reducing an alkali metal manganese compound selected from the group consisting of sodium permanganate, potassium permanganate, sodium manganate, potassium manganate and mixtures thereof to provide an amorphous reduced manganese dioxide which includes an alkali metal selected from the group consisting of sodium, potassium and mixtures thereof;

blending amorphous reduced manganese dioxide from the reduced alkali metal manganese compound with a lithium compound to provide a lithium compound/manganese dioxide blend, the lithium in the lithium compound being in stoichiometric excess of more than about one equivalent mole lithium for every mole of manganese in the manganese dioxide;

calcining the lithium compound/manganese dioxide blend at from about 150° to about 550° C. for about 2 to about 72 hours to provide an initially calcined lithium/manganese complex;

washing the initially calcined lithium/manganese complex with aqueous lithium hydroxide to provide a washed initially calcined lithium/manganese complex, the washing being effective to provide the washed initially calcined lithium/manganese complex which when slurried with water at a ratio of about 1 part complex to about 3 parts water will result in an aqueous slurry with a pH in the range of from about 11 to about 13;

slurrying the washed initially calcined lithium/manganese complex with water to provide an aqueous slurry and adjusting the pH of the aqueous slurry of the washed lithium/manganese complex to a pH of less than about 7, the pH adjustment effective to provide a lithium/manganese complex which when calcined will provide a lithiated manganese compound having the formula $Li_xMn_2O_4$ where x is greater than 0 and less than about 2; and calcining the lithium/manganese complex from about 500° to about 900° C. for a time effective to provide the lithiated manganese compound having the formula $Li_xMn_2O_4$ where x is greater than 0 and less than about 2.

12. A method as recited in claim 11 wherein the lithium compound is selected from the group consisting of lithium oxide, lithium carbonate, lithium nitrate, lithium sulfate, lithium hydroxide and mixtures thereof.

13. A method as recited in claim 11 wherein the lithium compound is lithium hydroxide.

14. A method as recited in claims 11 or 13 wherein the pH of the aqueous slurry of the washed lithium/manganese complex is adjusted to a range of from about 6.0 to about 6.5.

15. A method as recited in claim 14 where x is about 1.

16. A method as recited in claim 11 wherein the alkali metal manganese compound is reduced with an organic reducing compound which includes side chains having from about 1 to about four carbon atoms.

17. A method as recited in claims 11 or 13 wherein the alkali metal manganese compound is reduced with an organic reducing compound which has the general formula

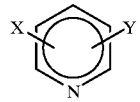

where at least one of x and y are methyl, ethyl, propyl and butyl, but one x or y may be H.

18. A method for making lithiated manganese oxide, the method comprising:

reducing an alkali metal permanganate selected from the group consisting of potassium permanganate and sodium permanganate with an organic reducing compound which includes side chains having from about 1 to about four carbon atoms under alkaline conditions to provide a permanganate reduced manganese dioxide;

blending the permanganate reduced manganese dioxide with a lithium compound to provide a lithium/manganese dioxide blend, the lithium in the lithium compound being in stoichiometric excess of more than about one equivalent mole lithium for every mole of manganese in the manganese dioxide;

calcining the lithium/manganese dioxide blend at time and temperature such that not more than about 10 weight percent of $Li_2MnO_4$ is formed, but sodium or potassium in the blend is converted into $M_2MnO_4$ or $M_3MnO_4$ wherein M=Na or K to provide an initially calcined lithium/manganese complex;

washing the initially calcined lithium/manganese complex with aqueous lithium hydroxide to provide a washed initially calcined lithium/manganese complex, the washing being effective to provide the washed initially calcined lithium/manganese complex which when slurried with water at a ratio of about 1 part complex to about 3 parts water will result in a slurry with a pH in the range of from about 11 to about 13;

slurrying the washed initially calcined lithium/manganese complex with water to provide an aqueous slurry and adding acid to the aqueous slurry in an amount effective to provide a pH of less than about 7 and effective to provide a lithium/manganese complex which when calcined will provide a lithiated manganese compound having the formula $Li_xMn_2O_4$ where x is greater than 0 and less than about 2; and calcining the lithium/manganese complex for a time and temperature effective to provide the lithiated manganese compound having the formula $Li_xMn_2O_4$ where x is greater than 0 and less than about 2, the time and temperature also effective to provide the lithiated manganese compound with an electromotive force of from about 3 to about 4 volts when it is used as a cathodic material in a battery which is recyclable at least about fifty times.

19. A method as recited in claim 18 wherein the lithium/manganese dioxide blend is calcined at from about 150° to about 550° C. for about 2 to about 72 hours and the lithium/manganese complex from about 500° to about 900° C.

20. A method as recited in claims 18 or 19 wherein a molar ratio of about two manganese atoms to about one lithium atom is provided under conditions of a pH of less than about 7.

21. A method as recited in claim 18 wherein the alkali metal permanganate is reduced with an organic reducing compound which has the general formula

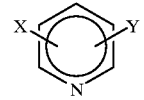

where at least one of x and y are methyl, ethyl, propyl and butyl, but one x or y may be H.

22. A method for making lithiated manganese oxide, the method effective for making lithiated manganese oxide having not more than about 0.005 moles of sodium and potassium per mole of manganese in the lithiated manganese oxide, the method comprising:

providing amorphous manganese dioxide which includes an alkali metal selected from the group consisting of sodium, potassium and mixtures thereof;

blending the amorphous manganese dioxide with a lithium compound to provide a lithium compound/manganese dioxide blend, the lithium in the lithium compound being in stoichiometric excess of more than about one equivalent mole lithium for every mole of manganese in the manganese dioxide;

calcining the lithium compound/manganese dioxide blend at from about 300° to about 500° C. for about 2 to about 10 hours to provide an initially calcined lithium/manganese complex;

washing the initially calcined lithium/manganese complex with aqueous lithium hydroxide to provide a washed initially calcined lithium/manganese complex, the washing being effective to provide the washed lithium/manganese complex which when slurried with water at a ratio of about 1 part complex to about 3 parts water will result in an aqueous slurry with a pH in the range of from about 11 to about 13;

slurrying the washed initially calcined lithium/manganese complex with water to provide an aqueous slurry and adjusting the pH of the aqueous slurry of the washed lithium/manganese complex to a pH of less than about 7, the pH adjustment effective to provide a lithium/manganese complex which when calcined will provide a lithiated manganese compound having the formula $Li_xMn_2O_4$ where x is greater than 0 and less than about 2; and calcining the lithium/manganese complex from about 500° to about 900° C. for a time effective to provide the lithiated manganese compound having the formula $Li_xMn_2O_4$ where x is greater than 0 and less than about 2.

23. A method for making lithiated manganese oxide, the method effective for making lithiated manganese oxide having not more than about 0.005 moles of sodium and potassium per mole of manganese in the lithiated manganese oxide, the method comprising:

chemically reducing under alkaline conditions an alkali metal manganese compound selected from the group consisting of sodium permanganate, potassium permanganate, sodium manganate, potassium manganate and mixtures thereof to provide an amorphous reduced manganese dioxide which includes an alkali metal selected from the group consisting of sodium, potassium and mixtures thereof;

blending amorphous reduced manganese dioxide from the reduced alkali metal manganese compound with a lithium compound to provide a lithium compound/manganese dioxide blend, the lithium in the lithium compound being in stoichiometric excess of more than about one equivalent mole lithium for every mole of manganese in the manganese dioxide;

calcining the lithium compound/manganese dioxide blend at from about 300° to about 500° C. for about 2 to about 10 hours to provide an initially calcined lithium/manganese complex;

washing the initially calcined lithium/manganese complex with aqueous lithium hydroxide to provide a washed initially calcined lithium/manganese complex, the washing being effective to provide the washed initially calcined lithium/manganese complex which when slurried with water at a ratio of about 1 part complex to about 3 parts water will result in an aqueous slurry with a pH in the range of from about 11 to about 13;

slurrying the washed initially calcined lithium/manganese complex with water to provide an aqueous slurry and adjusting the pH of the aqueous slurry of the washed lithium/manganese complex to a pH of less than about 7, the pH adjustment effective to provide a lithium/manganese complex which when calcined will provide a lithiated manganese compound having the formula $Li_xMn_2O_4$ where x is greater than 0 and less than about 2; and calcining the lithium/manganese complex from about 500° to about 900° C. for a time effective to provide the lithiated manganese compound having the formula $Li_xMn_2O_4$ where x is greater than 0 and less than about 2.

24. A method as recited in claim 23 wherein the lithium compound is selected from the group consisting of lithium oxide, lithium carbonate, lithium nitrate, lithium sulfate, lithium hydroxide and mixtures thereof.

25. A method as recited in claim 23 wherein the lithium compound is lithium hydroxide.

26. A method as recited in claims 23 or 25 wherein the pH of the aqueous slurry of the washed lithium/manganese complex is adjusted to a range of from about 6.0 to about 6.5.

27. A method as recited in claim 26 where x is about 1.

* * * * *